(12) United States Patent
Bond et al.

(10) Patent No.: US 11,698,490 B2
(45) Date of Patent: Jul. 11, 2023

(54) METHOD FOR FAST AND EFFICIENT FIBER TAPERING

(71) Applicant: Lawrence Livermore National Security, LLC, Livermore, CA (US)

(72) Inventors: Tiziana C. Bond, Livermore, CA (US); Sara Elizabeth Harrison, Fremont, CA (US); Catherine E. Reinhardt, Livermore, CA (US); Payal Kamlesh Singh, San Diego, CA (US); Victor V. Khitrov, San Ramon, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 17/462,734

(22) Filed: Aug. 31, 2021

(65) Prior Publication Data
US 2023/0067875 A1     Mar. 2, 2023

(51) Int. Cl.
*G02B 6/255* (2006.01)
*C03C 25/68* (2006.01)
*G02B 6/36* (2006.01)

(52) U.S. Cl.
CPC ............ *G02B 6/2552* (2013.01); *C03C 25/68* (2013.01); *G02B 6/3692* (2013.01)

(58) Field of Classification Search
CPC .............................. G02B 6/2552; C03C 25/68
See application file for complete search history.

(56) References Cited

U.S. PATENT DOCUMENTS 6,859,582 B2 * 2/2005 Cai .......................... G02B 6/10
385/28

FOREIGN PATENT DOCUMENTS

CN         112596174 A   *   4/2021   ............. G02B 6/245

OTHER PUBLICATIONS

G. Son; Y. Jung and K. Yu, "Tapered Optical Fiber Couplers Fabricated by Droplet-Based Chemical Etching," in IEEE Photonics Journal, vol. 9, No. 5, pp. 1-8, Oct. 2017, Art No. 7105208. doi: 10.1109/JPHOT.2017.2738661.

Cai, Ming. "Optical Fiber Taper Coupled Glass Microsphere Resonators", California Institute of Technology (2001), pp. 145.

* cited by examiner

*Primary Examiner* — Omar R Rojas
(74) *Attorney, Agent, or Firm* — Harness, Dickey & Pierce, P.L.C.

(57) ABSTRACT

The present disclosure relates to a method of forming a tapered optical fiber, where the optical fiber has a cladding encasing a core and has an initial outer diameter. The method involves applying opposing forces to spaced apart sections of the optical fiber. The spaced apart sections define a length portion representing a waist region. While applying the opposing forces, simultaneously applying heat to the waist region to gradually produce a taper of the optical fiber within the waist region. The taper has a first diameter at a midpoint of the waist region which is less than the initial outer diameter. An etch operation is then performed by chemically etching at least a subportion of the waist region of the optical fiber to reduce the subportion to a second diameter which is less than the first diameter.

19 Claims, 6 Drawing Sheets

| Initial Fiber Diameter (in microns) | Average Etch Rate (microns/minute) | Standard Deviation |
|---|---|---|
| 10 | 4.22 | 1.21 |
| 10 | 3.37 | 0.93 |
| 20 | 2.54 | 3.20 |
| 20 | 2.95 | 0.65 |
| 50 | 2.92 | 1.5 |

METHOD FOR FAST AND EFFICIENT FIBER TAPERING

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to systems and methods for manufacturing fibers, and more particularly to a system and method which is able to rapidly produce an adiabatically tapered fiber with a diameter smaller than what is attainable using only a fiber tapering machine, and with excellent reproducibility.

BACKGROUND

The statements in this section merely provide background information related to the present disclosure and may not constitute prior art.

Tapers on fibers, for example single mode fibers, are not commercially available and up until the present time, have required the skill of an artisan to make. In literature one can find examples of tapers made by means of temperature-assisted mechanical operation. One example of this is by pulling using a torch or a CO2 laser. Another example is by chemical etching (HF). Unfortunately, these existing methods cannot reproduce tapers down to, for example 2 um, quickly and reproducibly.

Accordingly, a strong need exists in the art for a system and method which enables tapered fibers to be formed rapidly, with excellent reproducibility, and with presently available etching processes and splicing tools.

SUMMARY

This section provides a general summary of the disclosure, and is not a comprehensive disclosure of its full scope or all of its features.

In one aspect the present disclosure relates to a method of forming a tapered optical fiber, where the optical fiber has a cladding encasing a core and has an initial outer diameter. The method may comprise applying opposing forces to spaced apart sections of the optical fiber, the spaced apart sections defining a length portion representing a waist region, while simultaneously applying heat to the waist region. This operates to gradually produce a taper of the optical fiber within the waist region. The taper has a first diameter at a midpoint of the waist region which is less than the initial outer diameter. The method may further include performing an etch operation by chemically etching at least a subportion of the waist region of the optical fiber to reduce the subportion to a second diameter which is less than the first diameter.

In another aspect the present disclosure relates to a method of forming a tapered optical fiber, where the optical fiber has a cladding encasing a core and has an initial outer diameter. The method may comprise elongating the optical fiber at a waist region while simultaneously applying heat to the waist region, to gradually produce an adiabatic taper of the optical fiber within the waist region. The taper has a first diameter at a midpoint of the waist region which is less than the initial outer diameter. The method may further include chemically etching at least a subportion of the waist region of the optical fiber, and while the chemical etching is taking place, simultaneously passing an optical signal of a predetermined power level through the optical fiber. The method may further include using a power measuring component to receive the optical signal and monitor a power level of the optical signal while the chemical etching is taking place. The chemical etching reduces the first diameter to a second diameter within the subregion of the waist region.

In still another aspect the present disclosure relates to an optical fiber comprising a cladding, a single mode core enclosed within the cladding, and an adiabatically tapered region. The adiabatically tapered region includes a subregion at a midpoint thereof being chemically etched to a diameter of about 2 microns.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure relates to a new system and method for hydrofluoric acid (HF) etching. The presently disclosed system and method enables tapering silica single mode fibers (SMF28) down to 2 um diameter in the narrowest region by a two-step process, which will be described in detail in the following paragraphs. The tapering is repeatable and is may be monitored by light coupling from light source to a detector through in-house connectorization applied to the fiber ends.

Figure 1:
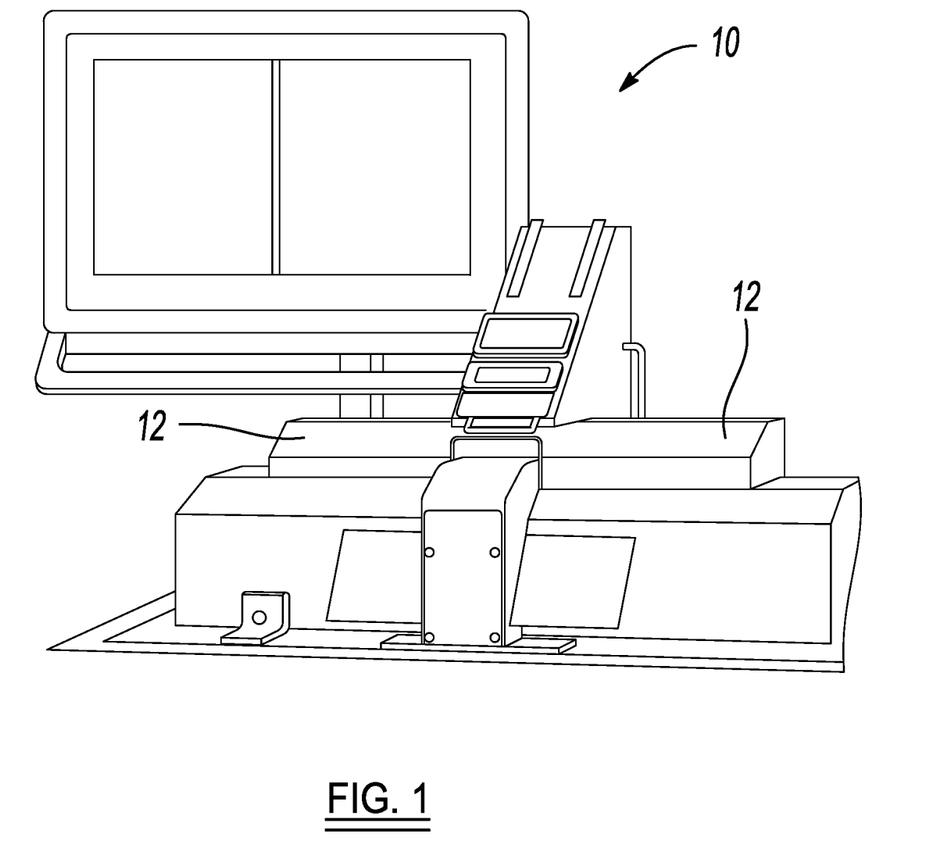
FIG. 1 is a perspective view of a commercially available optical fiber stretching machine for stretching an optical fiber

Referring briefly to FIG. 1, a well-known fiber splicing machine 10, commercially available from Fujikura LZM-100 LAZERMaster® $CO_2$ glass processing system, is shown. This is but one example of a suitable fiber stretching machine for use in performing an initial tapering operation of the present disclosure, and those skilled in the art will recognize that a number of other suitable machines are available for performing highly controlled fiber tapering. The optical fiber is too small to be seen in FIG. 1, but its ends would be secured at areas 12, which are then slowly moved away from one another while heat from a $CO_2$ laser is used to anneal a waist area of the fiber. This produces a gradual taper in the waist area of the fiber.

Figure 2:
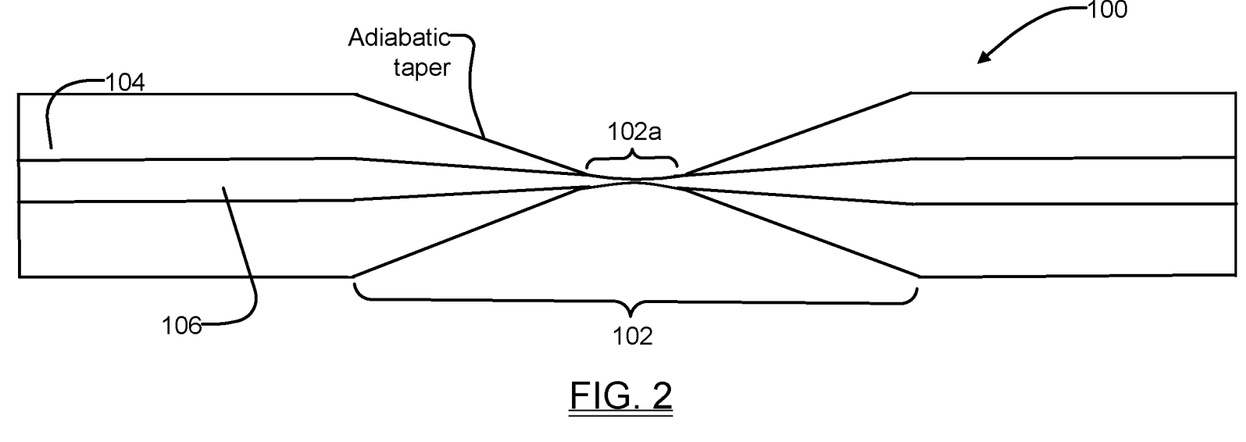
FIG. 2 is a high level, simplified side cross-sectional drawing illustrating an optical fiber after both the stretching and etching operations of the present disclosure are finished, and illustrating the adiabatic taper at the waist area of the fiber.

A highly enlarged and simplified side cross sectional view of a single mode optical fiber 100 is shown in FIG. 2 after the tapering and etching operations are performed in accordance with the present disclosure. A length forming a waist region of the fiber 100 is indicated by reference number 102. The initial tapering operation performed using the machine 10 imparts an adiabatic taper at the waist region 102, with a cladding 104 and a core 106 of the fiber 100 both tapering adiabatically toward a midpoint of the waist region. However, as noted above, generally this level of tapering is only sufficient to reduce the diameter of the fiber 100 from its original starting diameter down to around to 10 μm. The original starting diameter may vary significantly depending on the optical fiber selected, but often is between about 20 μm-50 μm, although the present disclosure may be used to taper optical fibers having a starting diameter greater or less than this range. A second operation, which is an etch operation, is then performed at a subregion 102a of the waist region 102 to significantly further reduce the diameter of the fiber 100 at the waist region 102. The etch operation, to be described in greater detail below, is able to impart an additional adiabatic taper which reduces the diameter of the fiber 100 in the waist subregion 102a down to less than about 2 μm, or possibly even slightly less, at a midpoint of the waist subregion 102a. This level of reduction in the diameter is not possible with just the initial tapering operation described above.

Figure 9:
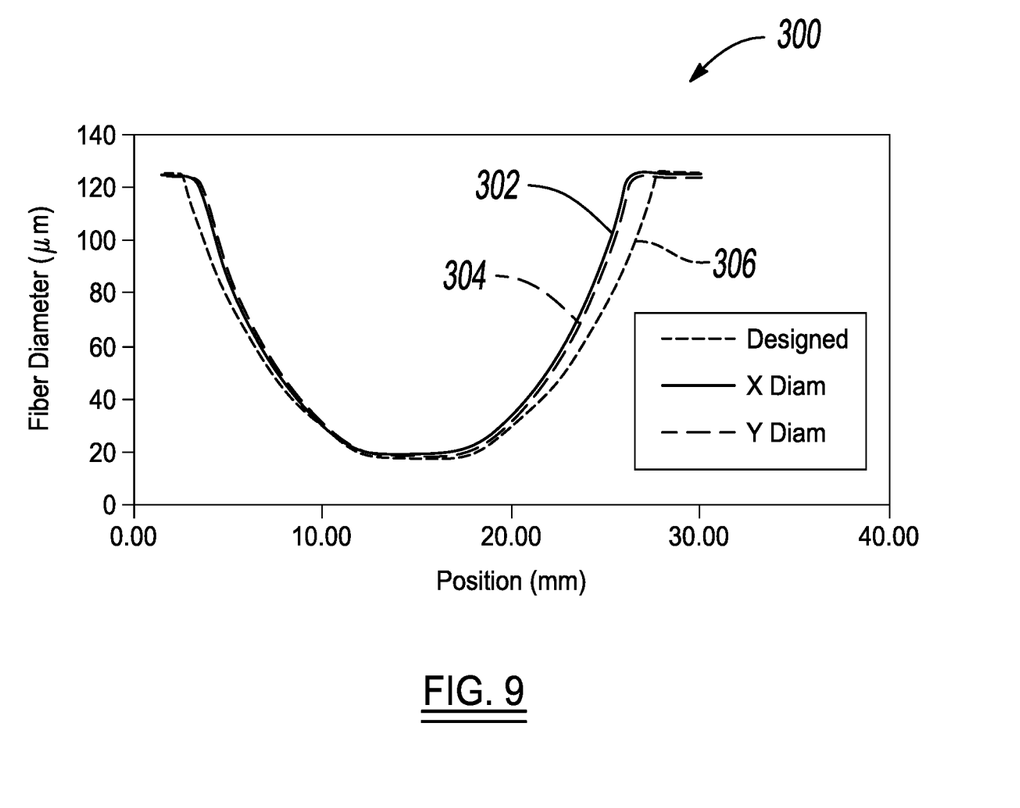
FIG. 9 is a graph with curves showing the diameters of the adiabatically tapered fiber of FIG. 2 in the X plane, the Y plane, and the X and Y diameters of the designed taper, illustrating how closely the taper created using the present invention matches the designed taper.

Referring to FIGS. 3-6, additional details associated with the two operations (manual tapering and etching) described above will now be provided. With reference to flowchart 200 of FIG. 3, initially the single mode optical fiber 100 is provided as indicated at operation 202. At operation 204, spaced apart sections of the fiber 100 are removably secured to movable supports and the supports are slowly, gently moved away from one another at a predetermined rate of movement (e.g., 0.001 mm/sec to 1.0 mm/sec) while heat (e.g., using $CO_2$ laser for laser annealing) is applied at the waist region 102, as described in connection with FIG. 1, to adiabatically taper the waist region 102. The system in this example uses a 30 W $CO_2$ laser with a 2.5 mm spot size as the heat source. Two drive motors are used to precisely control the pull speed of the fiber 100 during heating. The physical characteristics of the taper and heating parameters (power) are defined by the user, where typically the heating profile is gradually increased at the waist region 102 so that the $CO_2$ laser beam can get enough absorption. This fabrication procedure preferably uses a parabolic tapering mode of operation, which involves a series of consecutive heating and stretching passes to achieve the desired waist region 102 diameter. For each pass, the taper dimensions (waist region 102 diameter and length, and up and down taper lengths), absolute and waist region powers for the laser, and pre-heat times are tuned to achieve the desired profile. The profile is measured after each pass using internal profilometry techniques. An example the profile for a symmetrically tapered 20 μm fiber is shown in FIG. 1. The entire taper extends 30 mm with 20 μm waist region extending ~5 mm. A graph 300 is shown in FIG. 9 illustrating one example of how the waist region 102 may be adiabatically tapered, wherein curve 302 represents the fiber 100 diameter in the X plane, curve 304 represents the fiber diameter in the Y plane, and curve 306 represents the designed (i.e., desired) diameters of the fiber in the X and Y planes. This illustrates how close the final tapered waist region 102 matches the designed waist region.

Figure 3:
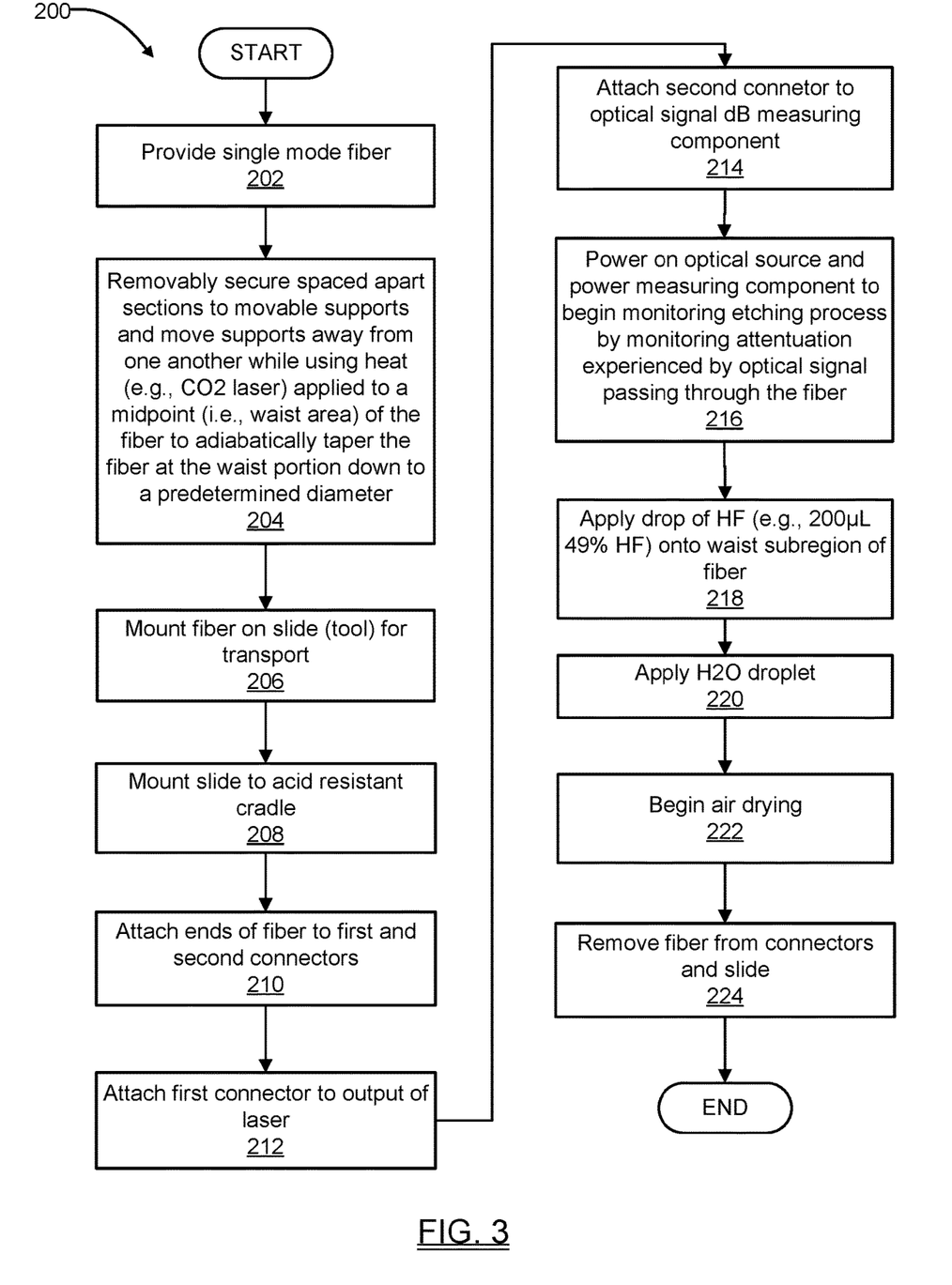
FIG. 3 is flowchart setting forth one example of operations that may be performed to construct an optical fiber with an etched waist area.
Figure 4:
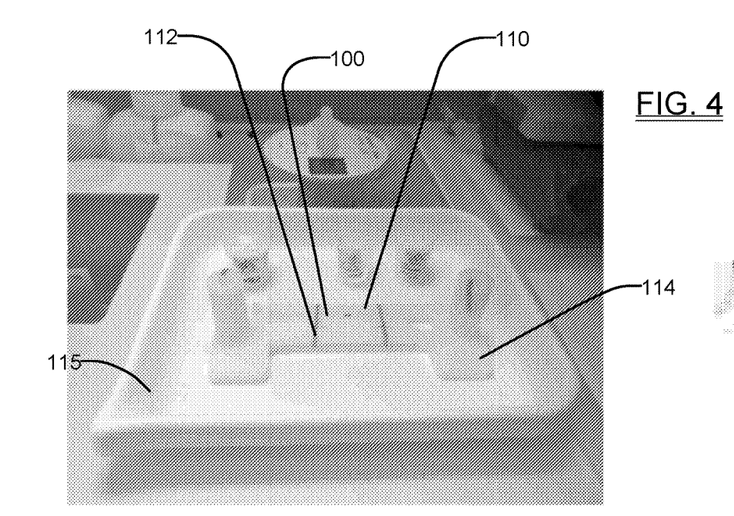
FIG. 4 is a perspective view of an acid resistant cradle supporting a slide thereon, with a length of fiber taped to the slide, and the tape also holding the slide stationary relative to the cradle.

Continuing with FIG. 3, at operation 206 the fiber 100 may then be mounted on a tool, such as a slide, for easy and safe transport. FIG. 4 shows this operation is greater detail where the fiber 100 is secured to a clear plastic slide 110 via a pair of sections of adhesive tape 112. At operation 208 the slide 110 may be secured to an acid resistant cradle 114 (e.g., made from TEFLON in this example), as shown in FIG. 3 using several lengths of adhesive tape 112. The cradle 114 may be custom made to any needed dimensions, but should be highly resistant to hydrofluoric acid (HD), which is one preferred acid for performing the etch operation. The cradle 114 shown in FIG. 4 was constructed via an additive manufacturing process, although any other manufacturing process capable of producing the size and shape of cradle one desires may be used. The sections of tape 112 may also be used to secure the slide 110 to the cradle 114 so that the slide and cradle 114 can be transported easily by hand as a single assembly during the manufacturing process. Any suitable tape may be used, for example clean room tape.

Figure 5:
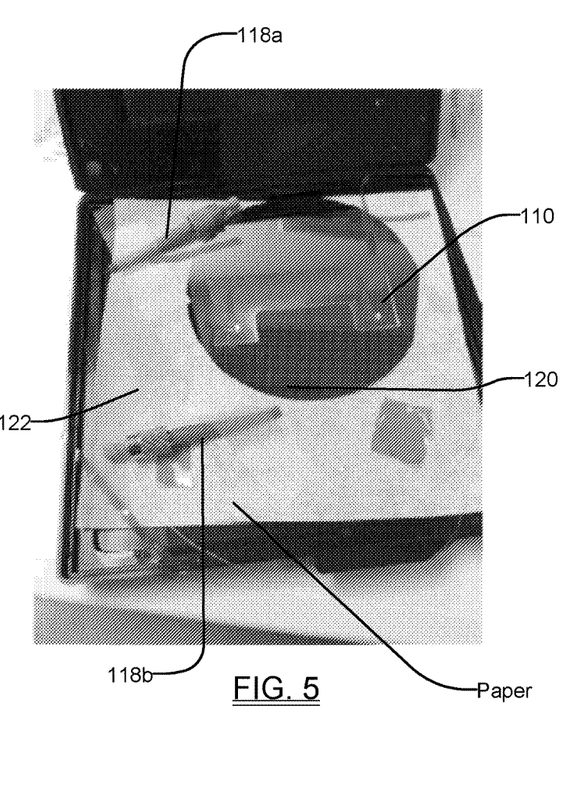
FIG. 5 is a perspective view of the slide positioned on a silicon wafer, with the ends of the fiber secured to two connectors which will be coupled to a laser source to feed an optical signal through the fiber during an etching operation.
Figure 6:
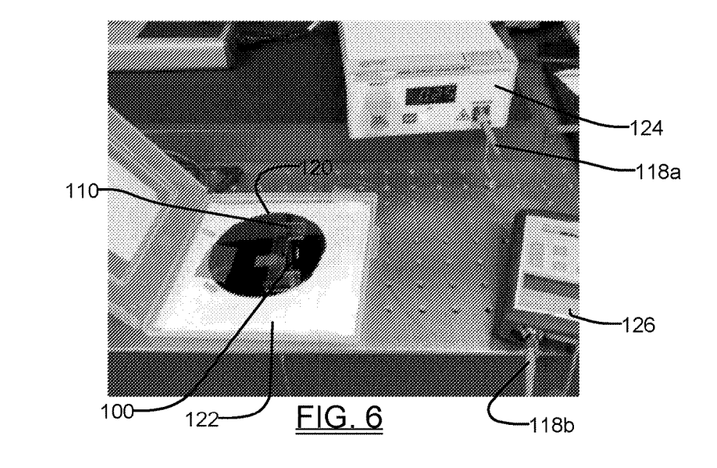
FIG. 6 is a perspective view showing the connectors of FIG. 4 connected to a laser source and a dB meter, to enable monitoring of a magnitude of an optical being fed through the fiber in real time while etching of a waist area of the fiber is occurring.

At operation 210 in FIG. 3 the ends of the fiber 100 are attached to optical fiber connectors to enable coupling to a laser and a power measuring component. This is also shown in FIG. 5 where commercially available fiber connectors 118a and 118b are coupled to opposite ends of the fiber 100. Connectors 118a and 118b are conventional connectors available from Thorlabs, Inc., and which enable coupling to external instrumentation ports to enable an optical signal to be passed through the fiber 100. FIG. 5 also shows the slide positioned on a silicon wafer 120, with a section of paper 122 having a cutout section exposing the silicon wafer under the slide. The fiber 100 may also be taped down at one or more locations on the paper 122 to further help prevent movement of the fiber 100 during the etch operation.

Referring further to FIG. 3, at operations 212 and 214 the connectors 118a and 118b may be coupled to an output of an optical source 124 and to a power measuring component 126, respectively. In this example the optical source 124 is a diode laser which transmits an optical signal of a specified wavelength and power level, in one example about 633 nm, to a ~3-6 dB measuring component 126. This enables the attenuation of the optical signal to be monitored in real time during the etch process.

At operation 216 in FIG. 3 the etch operation is commenced. Initially this involves powering on both the optical source 124 and the power measuring component 126, as indicated at operation 216. Then a small quantity of HF acid may be applied to the waist subregion 102a (shown in FIG. 1) of the fiber 100, as indicated at operation 218. The quantity of HF acid may be a droplet, for example about 100 µl-300 µl, and more preferably about 200 µl, of a mixture of HF acid and an aqueous solution. A conventional applicator (not shown) may be used to apply the droplet. In one example the droplet of HF acid and aqueous solution was about 49% HF acid by volume. At operation 220 a droplet of $H_2O$ is also applied to the waist subregion 102a. The cradle 110 may also be placed within a suitable acid resistant pan 115 (FIG. 4) to ensure the collection of any HF acid that may drip from the applicator during the etch process. Within a short time period after the application of the HF droplet, which in one instance was about 6.5 seconds, the HF droplet draws the taper at the waist subregion 102a of the fiber 100 down to about 2 um. During operations 218 and 220 the intensity of the optical signal passing through the fiber 100 may be monitored using the power measuring component 126.

With further reference to FIG. 3, air drying of the waist subregion 102a may then be performed, as indicated at operation 222, shortly after applying the droplet of HF acid (e.g., within 1-2 minutes for 10 um diameter fiber) after applying the HF droplet. Air drying may be done either without an air gun or with an air gun, but of course the drying time will be reduced if using an air gun. If an air gun is used, for example after about 10 seconds of air drying using the air gun, the fiber 100 will be dry and may then be uncoupled from the connectors 118a and 118b, released from the slide 110 and removed from the cradle 114, as indicated at operation 224. The finished fiber 100 is shown in FIG. 3. The subregion 102a of the fiber 100 in this example has a diameter of only about 2 µm, which is significantly smaller than what is attainable using only the tapering machine-implemented adiabatic tapering operation.

The fine etch operation described above thus enables dramatically smaller diameter tapers to be achieved than previously possible using only a tapering operation. The combination of the two steps, first tapering and then etching, overcomes the limitations inherent with tapering machines of not being able to reduce the diameter of the fiber 100 down below about 10 µm reliably.

Figure 7:
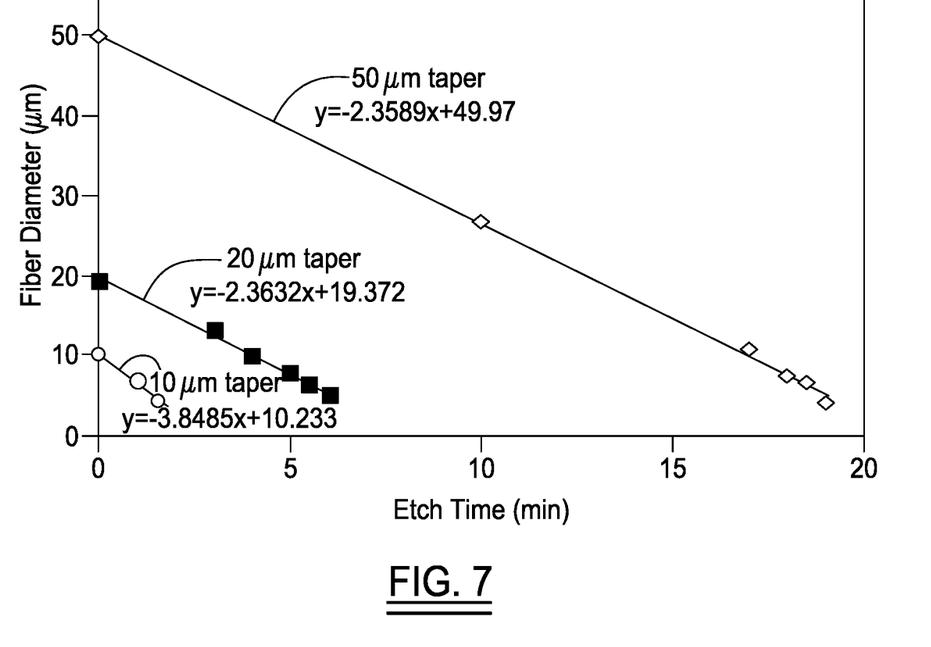
FIG. 7 is a graph showing etch time vs. fiber diameter for 10 $\mu$m, 20 $\mu$m and 50 $\mu$m diameter fibers.

Referring to FIG. 7, data is shown illustrate etch time versus fiber diameter for creating tapers starting with 10 µm, 20 µm and 50 µm diameter fibers.

Figure 8:
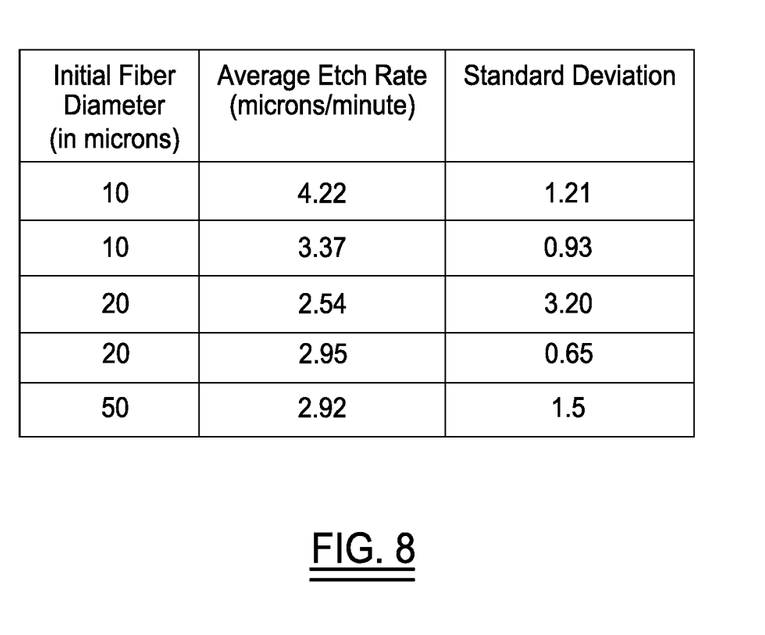
FIG. 8 is a table showing the initial fiber diameter (in microns), the average etch rate (microns/minute) and the standard deviation of the etch rate for the test results shown in the graphs of FIG. 7.

FIG. 8 shows statistical information gleaned from the data shown in FIG. 7.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method of forming a tapered optical fiber, where the optical fiber has a cladding encasing a core and has an initial outer diameter, the method comprising:

applying opposing forces to spaced apart sections of the optical fiber, the spaced apart sections defining a length portion representing a waist region, while simultaneously applying heat to the waist region, to gradually produce a first adiabatic taper of the optical fiber within the waist region, the first adiabatic taper having a first diameter at a midpoint of the waist region which is less than the initial outer diameter; and performing an etch operation by chemically etching at least a subportion of the waist region of the optical fiber to reduce the subportion to a second diameter which is less than the first diameter, to produce a second adiabatic taper within the subportion of the waist region which differs from the first adiabatic taper.

2. The method of claim 1, wherein the applying opposing forces to spaced apart sections of the optical fiber comprises using a tapering machine having movable portions, where the movable portions are secured to the spaced apart sections of the optical fiber, and controlling the movable portions to controllably apply opposing forces to the spaced apart sections while the heat is being applied to the waist region.

3. The method of claim 1, wherein applying heat to the waist region comprises using a laser to generate a beam which heats the waist region.

4. The method of claim 1, wherein the chemically etching comprises applying a quantity of an acid mixture to the subportion of the waist region.

5. The method of claim 4, wherein the quantity of acid mixture comprises a quantity of hydrofluoric (HF) acid which forms a quantity of HF acid mixture.

6. The method of claim 5, wherein the quantity of HF acid mixture includes a quantity of an aqueous solution mixed with the HF acid mixture to help form the HF acid mixture.

7. The method of claim 6, wherein the HF acid mixture comprises a quantity of about 200 μl.

8. The method of claim 7, wherein the HF acid mixture comprises approximately 49% HF acid by volume.

9. The method of claim 5, further comprising applying a quantity of water to the waist region after applying the quantity of HF acid mixture.

10. The method of claim 1, further comprising:
passing an optical signal through the optical fiber during the etch operation and monitoring a power level of the optical signal during the etch operation.

11. The method of claim 1, wherein the second diameter comprises a diameter of approximately 2 microns.

12. The method of claim 5, further comprising waiting a predetermined time period after applying the HF acid and then using an air gun to dry the subportion of the waist region of the optical fiber.

13. A method of forming a tapered optical fiber, where the optical fiber has a cladding encasing a core and has an initial outer diameter, the method comprising:
elongating the optical fiber at a waist region while simultaneously applying heat to the waist region, to gradually produce a first adiabatic taper of the optical fiber within the waist region, the first adiabatic taper having a first diameter at a midpoint of the waist region which is less than the initial outer diameter; and
chemically etching at least a subportion of the waist region of the optical fiber;
while the chemical etching is taking place, simultaneously passing an optical signal of a predetermined power level through the optical fiber;
using a power measuring component to receive the optical signal and monitor a power level of the optical signal while the chemical etching is taking place; and
wherein the chemical etching reduces the first diameter to a second diameter within the subportion of the waist region, and produces a second adiabatic taper, different from the first adiabatic taper, in the subportion of the waist region.

14. The method of claim 13, wherein the elongating the optical fiber comprises using a fiber tapering machine having movable portions secured to spaced apart sections of the optical fiber, to controllably, gradually draw the spaced apart sections away from one another to produce the first adiabatic taper at the waist region.

15. The method of claim 14, wherein the chemical etching comprises applying a quantity of a hydrofluoric (HF) acid mixture to the subportion of the waist region.

16. The method of claim 15, wherein the quantity of the HF acid mixture comprises a droplet of about 200 μl of the HF mixture.

17. The method of claim 15, wherein the HF acid mixture comprises about 49% HF acid by volume.

18. The method of claim 13, wherein the second diameter comprises a diameter of approximately 2 microns.

19. An optical fiber comprising:
a cladding;
a single mode core enclosed within the cladding;
an adiabatically tapered waist region having a first adiabatic taper; and
the adiabatically tapered region including a subregion at a midpoint thereof being chemically etched to a diameter of about 2 microns, to create a second adiabatic taper which differs from the first adiabatic taper.

* * * * *